United States Patent
Deschamps

(10) Patent No.: US 8,852,814 B2
(45) Date of Patent: Oct. 7, 2014

(54) METHOD FOR DEVELOPING AN ELECTROCHEMICAL DEVICE

(75) Inventor: Marc Deschamps, Quimper (FR)

(73) Assignee: Blue Solutions, Quimper (FR)

( * ) Notice: Subject to any disclaimer, the term of this patent is extended or adjusted under 35 U.S.C. 154(b) by 1983 days.

(21) Appl. No.: 10/588,976

(22) PCT Filed: Feb. 9, 2005

(86) PCT No.: PCT/FR2005/000289
§ 371 (c)(1),
(2), (4) Date: Aug. 10, 2006

(87) PCT Pub. No.: WO2005/078827
PCT Pub. Date: Aug. 25, 2005

(65) Prior Publication Data
US 2007/0169338 A1    Jul. 26, 2007

(30) Foreign Application Priority Data
Feb. 10, 2004 (FR) ..................... 04 01285

(51) Int. Cl.
*H01M 2/10* (2006.01)
*H01M 10/00* (2006.01)
*H01M 10/0565* (2010.01)
*H01M 10/04* (2006.01)
*H01M 10/052* (2010.01)
*H01M 10/0525* (2010.01)
*H01M 4/58* (2010.01)
*H01M 4/485* (2010.01)

(52) U.S. Cl.
CPC ...... *H01M 10/0436* (2013.01); *H01M 10/0565* (2013.01); *H01M 10/0525* (2013.01); *Y02E 60/122* (2013.01); *H01M 4/5825* (2013.01); *H01M 10/052* (2013.01); *H01M 4/485* (2013.01); *H01M 2300/0085* (2013.01)
USPC ....................................... 429/304

(58) Field of Classification Search
CPC ......... H01M 2/16; H01M 2/14; H01M 2/145; H01M 10/0436; H01M 10/0565; H01M 2300/0025
USPC .......................................... 29/623.1; 429/304
See application file for complete search history.

(56) References Cited

U.S. PATENT DOCUMENTS

| 5,552,239 | A | * | 9/1996 | Gozdz et al. | 429/94 |
| 5,622,792 | A | | 4/1997 | Brochu et al. | |
| 5,888,672 | A | | 3/1999 | Gustafson et al. | |
| 5,972,055 | A | * | 10/1999 | Gao et al. | 29/623.5 |
| 2003/0136500 | A1 | * | 7/2003 | Yu | 156/229 |
| 2003/0228521 | A1 | * | 12/2003 | Hayase et al. | 429/303 |
| 2004/0023106 | A1 | * | 2/2004 | Benson et al. | 429/122 |
| 2004/0024174 | A1 | * | 2/2004 | Harvey et al. | 528/421 |
| 2005/0014063 | A1 | * | 1/2005 | Shi et al. | 429/144 |

FOREIGN PATENT DOCUMENTS

| EP | 1339128 | 8/2003 |
| JP | 8298136 | 11/1996 |
| JP | 2000106212 | 4/2000 |
| JP | 2002298919 | 10/2002 |

OTHER PUBLICATIONS

Machine translation of JP 2002-298919, pub. Oct. 2002.*
International Search Report dated Apr. 10, 2006.

* cited by examiner

*Primary Examiner* — Milton I Cano
*Assistant Examiner* — Stephen Yanchuk
(74) *Attorney, Agent, or Firm* — Merchant & Gould

(57) ABSTRACT

The invention relates to the development of an electrochemical device including a lithium salt/polyether electrolyte film between two films forming the cathode and the anode, respectively. The method of the invention involves assembling a multilayer structure consisting of the current-collecting carrier, the cathode-forming film, the electrolyte-forming polyether film and the anode-forming film. The cathode and/or anode films are made of a composite material containing the lithium salt. The polyether film is lithium salt-free. The assembled device is allowed to rest for long enough to enable the lithium salt in the cathode and/or the anode to be dispersed throughout the polymer film.

23 Claims, No Drawings

METHOD FOR DEVELOPING AN ELECTROCHEMICAL DEVICE

CROSS REFERENCE TO RELATED APPLICATIONS

This application claims the benefit of and priority to PCT/FR2005/000289, filed on Feb. 9, 2005 which is incorporated herein by reference in its entirety.

BACKGROUND OF THE INVENTION

The present invention relates to a process for the preparation of an electrochemical system comprising a solid polymer electrolyte or comprising a gelled electrolyte.

Electrochemical systems for energy storage, for example batteries or supercapacitors, which operate with high cell voltages, require electrolytes which have a broad stability range. Such electrolytes are obtained by dissolution of one or more ionic compounds in a polar liquid solvent, a solvating polymer, or their mixtures. Electrochemical systems in which the electrolyte comprises a lithium salt and a polymer solvent of the polyether type are particularly advantageous. Such systems, which operate by circulation of lithium ions through an electrolyte between an anode and a cathode, can be composed of two electrodes in the form of films between which the electrolyte, also in the film form, is confined, the multilayer assembly thus formed being rolled up. However, the preparation of such a device presents problems. First, the lithium salts are generally hygroscopic and the preparation of the polyether material/lithium salt has to be carried out in an anhydrous atmosphere. Secondly, a polyether is a weakly crystalline polymer which, blended with a lithium salt, forms a complex constituting a sticky material. For this reason, it is difficult to prepare a polyether material/lithium salt film by extrusion. To overcome this disadvantage, the proposal has been made to use backing films in order to prevent the polyether/lithium salt film from sticking to itself. However, when it is desired to remove the backing film, the strong adhesion between the backing film and the electrolytic film causes splits which render the electrolyte unusable.

SUMMARY OF THE INVENTION

The inventors have found that, surprisingly, a polyether film which does not comprise salt can be prepared by the conventional methods and can be protected by a backing film before its final use, it being possible for said backing film to be detached from the polyether film without damaging it due to the low adhesion between the polyether and the backing film.

The aim of the present invention is to provide a simple process for the preparation of electrochemical systems comprising a polyether/lithium salt electrolyte.

DETAILED DESCRIPTION OF THE PREFERRED EMBODIMENTS

The process according to the invention for the preparation of an electrochemical device composed of a polyether/lithium salt electrolyte film between two films respectively constituting the positive electrode and the negative electrode consists in assembling a multilayer structure comprising a current-collecting support, a film intended to form the positive electrode, a polyether film (hereinafter denoted by "initial polyether film") and a film intended to form the negative electrode. It is characterized in that:

the film intended to form the positive electrode and/or the film intended to form the negative electrode are composed of a composite material comprising the lithium salt;

the initial polyether film does not comprise lithium salt;

the assembled device is left at rest for a time sufficient to allow the lithium salt present in the material of the positive electrode and/or in the material of the negative electrode to diffuse into the initial polyether film.

In this type of electrochemical device, the films respectively constituting the negative electrode, the positive electrode and the electrolyte have thicknesses of between 10 µm and 150 µm. Due to the thinness of these films, the diffusion of the lithium ions into the polyether film is sufficient to prevent the concentration gradient of salt in said film. The diffusion stage can be carried out at ambient temperature. The diffusion can be accelerated by increasing the temperature.

Mention may in particular be made, as examples of polyethers which can be used in the context of the present invention for the film intended to form the electrolyte, of the copolymers which are obtained from ethylene oxide and from at least one substituted oxirane and which comprise at least 70% of —$CH_2$—$CH_2O$— repeat units derived from ethylene oxide.

The repeat units derived from a substituted oxirane can be —O—$CH_2$—CHR— units (derived from an oxirane $\overline{CH_2—CHR—O}$) in which R is an alkyl radical preferably chosen from alkyl radicals having from 1 to 16 carbon atoms, more preferably from alkyl radicals having from 1 to 8 carbon atoms.

The repeat units derived from a substituted oxirane can in addition be —O—$CH_2CHR'$— units (derived from an oxirane $\overline{CH_2—CHR'—O}$) in which R' is a group capable of polymerizing by the radical route. Such a group can be chosen from those which comprise a double bond, for example a vinyl, allyl, vinylbenzyl or acryloyl group. Mention may be made, as examples of such groups, of the groups which correspond to the formula $CH_2=CH—(CH_2)_q—(O—CH_2)_p$ with $1<q<6$ and $p=0$ or $1$, or to the formula $CH_3—(CH_2)_y—CH=CH—(CH_2)_x—(OCH_2)_p$, with $0<x+y<5$ and $p=0$ or $1$.

A polyether of use in the present invention may comprise repeat units derived from several substituted oxiranes.

Preferably, the polyether used according to the present invention comprises repeat units derived from at least one substituted oxirane in which the substituent comprises a polymerizable functional group. Mention may be made, by way of example, of allyl glycidyl ether.

The lithium salt can be chosen in particular from $LiPF_6$, $LiAsF_6$, $LiClO_4$, $LiBF_4$, $LiC_4BO_8$, $Li\ (C_2F_5SO_2)_2N$, $Li[(C_2F_5)_3PF_3]$, $LiCF_3SO_3$, $LiCH_3SO_3$ and $LiN(SO_2CF_3)_2$.

The composite material of the film intended to form the positive electrode comprises an active material, a binder, the lithium salt and optionally a material conferring electronic conductivity.

The positive electrode active material can be chosen in particular from $Li_{1+x}V_3O_8$, $0<x<4$, $Li_xV_2O_5.nH_2O$ ($0<x<3$, $0<n<2$), $LiFePO_4$, hydrated or anhydrous iron phosphates and sulfates, hydrated or anhydrous vanadyl phosphates and sulfates [for example, $VOSO_4$ and $Li_xVOPO_4.nH_2O$ ($0<n<3$, $0<x<2$)], $LiMn_2O_4$, the compounds derived from $LiMn_2O_4$ obtained by partial substitution of Mn, preferably by Al, Ni and/or Co, $LiMnO_2$, the compounds derived from $LiMnO_2$ obtained by partial substitution of Mn, preferably by Al, Ni and/or Co, $LiCoO_2$, the compounds derived from $LiCoO_2$ obtained by partial substitution of Li, preferably by Al, Ti, Mg, Ni and/or Mn [for example, $LiAl_xNi_yCo_{(1-x-y)}O_2$ ($x<0.5$, y<1)], LiNiO$_2$ and the compounds derived from LiNiO$_2$ obtained by partial substitution of Ni, preferably by Al, Ti, Mg and/or Mn.

The binder of the positive electrode is an organic binder electrochemically stable up to a potential of 4V vs Li. Said binder can be composed either of a nonsolvating polymer and at least one polar aprotic compound, or of a solvating polymer.

The polar aprotic compound can be chosen from linear or cyclic carbonates, linear or cyclic ethers, linear or cyclic esters, linear or cyclic sulfones, sulfamides and nitriles.

The nonsolvating polymer can be chosen from:
vinylidene fluoride homopolymers and copolymers,
copolymers of ethylene, of propylene and of a diene,
tetrafluoroethylene homopolymers and copolymers,
N-vinylpyrrolidone homopolymers and copolymers,
acrylonitrile homopolymers and copolymers,
methacrylonitrile homopolymers and copolymers.

The nonsolvating polymer can carry ionic functional groups. Mention may be made, as example of such a polymer, of polyperfluoroether sulfonate salts, some of which are available commercially under the name Nafion®, and polystyrene sulfonate salts.

When the binder is a solvating polymer, it confers ionic conduction properties and better mechanical strength on the material. Mention may be made, as examples of solvating polymers, of polyethers of linear, comb or block structure, forming or not forming a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin; and networks obtained by polycondensation which carry groups which make possible the incorporation of crosslinkable groups. Copolymers of ethylene oxide and of a crosslinkable comonomer are particularly preferred as binder of the composite material of the positive electrode conferring ionic conduction and mechanical properties.

The compound conferring electronic conduction properties is preferably a carbon black which does not catalyze the oxidation of the electrolyte at high potential. Many commercial carbon blacks meet this condition. Mention may in particular be made of the compound Ensagri Super S®, sold by Chemetals.

The film intended to form the negative electrode of the electrochemical device prepared according to the process of the present invention can be composed of a lithium film. It can in addition be composed of a composite material comprising a negative electrode active material, the lithium salt, a binder and optionally a compound conferring electronic conductivity. The active material is chosen in particular from:
carbon compounds (natural or synthetic graphites, disordered carbons, and the like),
alloys with lithium of Li$_x$M type (M=Sn, Sb, Si, and the like) (obtained from SnO, from SnO$_2$, from Sn, Sn—Fe (—C) compounds, from Si compounds, from Sb compounds), or
Li$_x$Cu$_6$Sn$_5$ (0<x<13) compounds, iron borates, pnictides (for example, Li$_{3-x-y}$Co$_y$N, Li$_{3-x-y}$Fe$_y$N, Li$_x$MnP$_4$, Li$_x$FeP$_2$, Li$_x$FeSb$_2$, and the like), simple oxides possessing reversible decomposition (for example, CoO, Co$_2$O$_3$, Fe$_2$O$_3$, and the like) and insertion oxides, such as titanates (for example, TiO$_2$ or Li$_4$Ti$_5$O$_{12}$), MoO$_3$ or WO$_3$.

The binder of a negative composite electrode can be chosen from the binders defined above for the positive electrode. Likewise, the compound conferring electronic conductivity on the negative electrode can be chosen from the compounds defined for the positive electrode.

The material intended to form one and/or other of the electrodes can additionally comprise a nonvolatile liquid organic solvent. In this specific case, said liquid solvent migrates into the polyether film during the resting stage of the preparation process. The electrolyte film finally present in the electrochemical device is then a gelled film. In this specific case, the polyether is preferably a copolymer comprising crosslinkable units which, after crosslinking, retains satisfactory mechanical strength in the presence of the liquid solvent. Said liquid solvent can be chosen in particular from:
polar aprotic compounds, such as linear or cyclic carbonates, linear or cyclic ethers, linear or cyclic esters, linear or cyclic sulfones, sulfamides and nitriles,
phthalates, such as dioctyl phthalate, dibutyl phthalate and dimethyl phthalate,
a polyethylene glycol or poly(ethylene glycol) dimethyl ether of low mass.

When the polyether of the film intended to form the electrolyte is a copolymer comprising crosslinkable units, the electrode(s) which is (are) composed of a composite material can additionally comprise a crosslinking agent for said polyether. In this case, during the resting stage of the preparation process, said crosslinking agent migrates into the polyether film and brings about the crosslinking thereof, which improves the mechanical strength.

The present invention is illustrated by the following examples, to which, however, it is not limited.

Example 1

Preparation of a Solid Polymer Electrolyte Battery

A film intended to form the electrolyte and a film intended to form the positive electrode of a lithium battery, the anode of which is composed of a lithium sheet, were prepared separately.

The film intended to form the electrolyte is a film which has a thickness of 20 μm and which is composed of a copolymer of ethylene oxide, of propylene oxide and of allyl glycidyl ether (AGE), with a ratio by number of the respective repeat units of 94/4/2. The film intended to form the positive electrode is composed of a composite material comprising LiV$_3$O$_8$ as active material, carbon as agent conferring electronic conductivity, a poly(vinylidene fluoride/hexafluoropropylene) (PVDF/HFP) mixture (85/15 by weight) as binder, LiTFSI as lithium salt and Irganox®, sold by Ciba-Geigy, as antioxidant.

Several tests were carried out with different amounts for the various constituents. The first six columns of the table below give the percentages by weight of the constituents of the positive electrode. "O/Li cathode" represents the O/Li atomic ratio in the positive electrode, ThC$^+$ represents the thickness of the film constituting the positive electrode, total O/Li represents the O/Li atomic ratio in the battery (positive electrode+electrolyte after diffusion).

| POE | LiV$_3$O$_8$ | C | Irganox | PVDF/HFP | LiTFSI | O/Li cathode | ThC$^+$ (μm) | Total O/Li |
|---|---|---|---|---|---|---|---|---|
| 20.8 | 54 | 14 | 0.20 | 3.00 | 8 | 17 | 110 | 25.8 |
| 20.58 | 53.43 | 13.85 | 0.20 | 2.97 | 8.98 | 14.95 | 80 | 25.8 |
| 20.22 | 52.49 | 13.61 | 0.19 | 2.92 | 10.57 | 12.5 | 55 | 25.8 |
| 18.50 | 48.03 | 12.45 | 0.18 | 2.67 | 18.18 | 6.6 | 80 | 12 |

For each of the tests, the cathode film, the POE film and the lithium film were assembled by superimposing said films in the order shown on a current collector and by then applying a pressure of 3 bar at a temperature of 45° C.

Each of the batteries thus formed was tested by cycling under a voltage of between 2 and 3.3V with a discharge current of 0.7 mA/cm$^2$ and a charge current of 0.35 mA/cm$^2$.

The results obtained as regards energy, power and cycling are similar to those which are obtained with batteries having the same structure obtained from a POE film into which the lithium salt was introduced before the assembling.

Example 2

Preparation of a Gelled Electrolyte Battery

A film intended to form the electrolyte and a film intended to form the positive electrode of a lithium battery, the anode of which is a lithium sheet, were prepared separately.

The film intended to form the electrolyte is a film which has a thickness of 20 μm and which was obtained by extrusion of a mixture consisting of 99% by weight of a copolymer of ethylene oxide, of propylene oxide and of AGE analogous to that used in example 1 and 1% by weight of Irgacure® crosslinking agent sold by Ciba-Geigy.

The film intended to form the positive electrode (CG) has a thickness of 80 μm and it is composed of a material having the following composition:
LiV$_3$O$_8$: 45% by weight
Carbon: 12% by weight
PVDF/HFP: 15% by weight
1M solution of LiTFSI in an EC/PC (1/1) mixture: 28% by weight.

The three films were applied to a current collector in order to obtain a battery having the following configuration: Li/POE/CG/current collector.

After a resting time of 1 h, the battery operates at ambient temperature, which means that the TFSI solution present in the starting film of the positive electrode has impregnated the POE film, which has become a gelled electrolyte.

The resistivity at ambient temperature of the electrolyte of this battery, determined by impedance measurement, is of the order of 10 Ω·cm$^2$. This result confirms that the liquid electrolyte has diffused into the polymer membrane and has gelled it.

What is claimed is:

1. A process comprising:
providing a first film intended to form a positive electrode and a second film intended to form a negative electrode, where one or both of the films comprise a lithium salt;
providing an extruded polyether film which is not impregnated with a lithium salt;
assembling a multilayer structure comprising a current collecting support and the first and second films as electrodes and the extruded polyether film, which is not impregnated with a lithium salt, as an electrolyte; and
allowing diffusion of the lithium salt from one or both of the electrodes into the polyether film.

2. The process as claimed in claim 1, wherein the films respectively constituting the negative electrode, the positive electrode and the electrolyte have thicknesses of between 10 μm and 150 μm.

3. The process as claimed in claim 1, wherein the polyether is chosen from the copolymers which are obtained from ethylene oxide and from at least one substituted oxirane and which comprise at least 70% of —CH$_2$—CH$_2$O— repeat units derived from ethylene oxide.

4. The process as claimed in claim 3, wherein the polyether comprises —O—CH$_2$—CHR— units, derived from an oxirane $\overline{CH_2—CHR—O}$, in which R is an alkyl radical.

5. The process as claimed in claim 4, wherein R is an alkyl radical having from 1 to 16 carbon atoms.

6. The process as claimed in claim 3, wherein the polyether comprises —O—CH$_2$CHR'— units, derived from an oxirane $\overline{CH_2—CHR'—O}$ in which R' is a group capable of polymerizing by the radical route.

7. The process as claimed in claim 6, wherein said group capable of polymerizing by the radical route is selected from the group consisting of a vinyl, allyl, vinylbenzyl and acryloyl group.

8. The process as claimed in claim 3, wherein the polyether comprises repeat units derived from several substituted oxiranes.

9. The process as claimed in claim 1, wherein the composite material of the film intended to form the positive electrode comprises an active material, a binder, a material conferring electronic conductivity and the lithium salt.

10. The process as claimed in claim 9, wherein the positive electrode active material is selected from the group consisting of Li$_{1+x}$V$_3$O$_8$, 0<x<4, Li$_x$V$_2$O$_5$·nH$_2$O, 0<x<3, 0<n<2, LiFePO$_4$, hydrated or anhydrous iron phosphates and sulfates, hydrated or anhydrous vanadyl phosphates and sulfates, LiMn$_2$O$_4$, the compounds derived from LiMn$_2$O$_4$ obtained by partial substitution of Mn by Al, Ni and/or Co, LiMnO$_2$, the compounds derived from LiMnO$_2$ obtained by partial substitution of Mn by Al, Ni and/or Co, LiCoO$_2$, the compounds derived from LiCoO$_2$ obtained by partial substitution of Li by Al, Ti, Mg, Ni and/or Mn, LiNiO$_2$ and the compounds derived from LiNiO$_2$ obtained by partial substitution of Ni by Al, Ti, Mg and/or Mn.

11. The process as claimed in claim 1, wherein the film constituting the negative electrode is a lithium film.

12. The process as claimed in claim 1, wherein the film intended to form the negative electrode is composed of a composite material which comprises an active material, a binder, a material conferring electronic conductivity and the lithium salt.

13. The process as claimed in claim 12, wherein the active material is selected from the group consisting of:
carbon compounds,
alloys with lithium of Li$_x$M type (M=Sn, Sb, Si) (obtained from SnO, from SnO$_2$, from Sn, Sn—Fe(—C) compounds, from Si compounds, from Sb compounds), and Li$_x$Cu$_6$Sn$_5$ (0<x<13) compounds, iron borates, pnictides, simple oxides possessing reversible decomposition and insertion oxides, such as titanates, MoO$_3$ or WO$_3$.

14. The process as claimed in claim 1, wherein the lithium salt is selected from the group consisting of LiPF$_6$, LiAsF$_6$, LiClO$_4$, LiBF$_4$, LiC$_4$BO$_8$, Li(C$_2$F$_5$SO$_2$)$_2$N, Li[(C$_2$F$_5$)$_3$PF$_3$], LiCF$_3$SO$_3$, LiCH$_3$SO$_3$ and LiN(SO$_2$CF$_3$)$_2$.

15. The process as claimed in claim 9, wherein the binder is composed either of a nonsolvating polymer and at least one polar aprotic compound, or of a solvating polymer.

16. The process as claimed in claim 15, wherein the polar aprotic compound is selected from the group consisting of linear or cyclic carbonates, linear or cyclic ethers, linear or cyclic esters, linear or cyclic sulfones, sulfamides and nitriles.

17. The process as claimed in claim 15, wherein the nonsolvating polymer is selected from the group consisting of:
vinylidene fluoride homopolymers and copolymers,
copolymers of ethylene, of propylene and of a diene,
tetrafluoroethylene homopolymers and copolymers,
N-vinylpyrrolidone homopolymers and copolymers,
acrylonitrile homopolymers and copolymers, and methacrylonitrile homopolymers and copolymers.

18. The process as claimed in claim 15, wherein the nonsolvating polymer carries ionic functional groups.

19. The process as claimed in claim 15, wherein the binder is a solvating polymer selected from the group consisting of polyethers of linear, comb or block structure, forming or not forming a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin; and networks obtained by polycondensation which carry groups which make possible the incorporation of crosslinkable groups.

20. The process as claimed in claim 9, wherein the compound conferring electronic conduction properties is preferably a carbon black which does not catalyze the oxidation of the electrolyte at high potential.

21. The process as claimed in claim 9, wherein the composite material additionally comprises a nonvolatile liquid organic solvent.

22. The process as claimed in claim 21, wherein said liquid solvent is selected from the group consisting of:
polar aprotic compounds, such as linear or cyclic carbonates, linear or cyclic ethers, linear or cyclic esters, linear or cyclic sulfones, sulfamides and nitriles,
phthalates, such as dioctyl phthalate, dibutyl phthalate and dimethyl phthalate, and
a polyethylene glycol or poly(ethylene glycol) dimethyl ether of low mass.

23. The process as claimed in claim 1, wherein the polyether of the film intended to form the electrolyte is a copolymer comprising crosslinkable units and in that at least one of the electrodes is composed of a composite material which additionally comprises a crosslinking agent for said polyether.

* * * * *